United States Patent
Ahmavaara

(10) Patent No.: US 9,655,005 B2
(45) Date of Patent: May 16, 2017

(54) OFFLOAD SERVICES VIA A NEUTRAL HOST NETWORK

(71) Applicant: QUALCOMM Incorporated, San Diego, CA (US)

(72) Inventor: Kalle Ilmari Ahmavaara, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 63 days.

(21) Appl. No.: 14/731,153

(22) Filed: Jun. 4, 2015

(65) Prior Publication Data
US 2016/0100331 A1   Apr. 7, 2016

Related U.S. Application Data

(60) Provisional application No. 62/061,030, filed on Oct. 7, 2014.

(51) Int. Cl.
*H04W 28/08* (2009.01)
*H04W 84/04* (2009.01)
*H04W 72/04* (2009.01)
*H04W 48/18* (2009.01)
(Continued)

(52) U.S. Cl.
CPC ........... *H04W 28/08* (2013.01); *H04W 48/18* (2013.01); *H04W 72/0406* (2013.01); *H04W 84/042* (2013.01); *H04W 12/06* (2013.01); *H04W 48/12* (2013.01)

(58) Field of Classification Search
CPC ..... H04W 12/06; H04W 28/08; H04W 48/12; H04W 48/18; H04W 48/20; H04W 72/02; H04W 72/04; H04W 72/0406; H04W 72/1252; H04W 84/042; H04W 68/12;
(Continued)

(56) References Cited

U.S. PATENT DOCUMENTS 8,107,464 B2  1/2012  Schmidt et al.
8,224,233 B2  7/2012  Brisebois et al.
(Continued)

FOREIGN PATENT DOCUMENTS

WO  WO-2013/116984 A1  8/2013
WO  WO-2013/126843 A2  8/2013

OTHER PUBLICATIONS

International Search Report and Written Opinion—PCT/US2015/048360—ISA/EPO—Dec. 10, 2015. (21 total pages).
(Continued)

*Primary Examiner* — Mohamed Kamara
(74) *Attorney, Agent, or Firm* — Arent Fox, LLP

(57) ABSTRACT

Techniques for providing offload services via a neutral host network (NHN) are described here. An example method may include establishing an authorization relationship, at the NHN, with a mobile network. In addition, the example method may include sending a notification indicating the authorization relationship of the NHN with the mobile network to one or more user equipments (UEs) within radio coverage of the NHN, wherein the authorization relationship specifies that the NHN is authorized by the mobile network to provide offload services for at least one UE of the one or more UEs that is associated with the mobile network.

45 Claims, 11 Drawing Sheets

(51) Int. Cl.
*H04W 12/06* (2009.01)
*H04W 48/12* (2009.01)

(58) Field of Classification Search
CPC ..... H04W 88/06; H04W 88/08; H04W 88/10; H04W 92/04; H04W 92/06
See application file for complete search history.

(56) References Cited

U.S. PATENT DOCUMENTS

| | | | |
|---|---|---|---|
| 2007/0010248 A1* | 1/2007 | Dravida | H04W 60/00 455/435.1 |
| 2007/0076696 A1* | 4/2007 | An | H04L 29/06027 370/352 |
| 2007/0161373 A1 | 7/2007 | Klatt | |
| 2012/0020260 A1* | 1/2012 | Chen | H04W 28/08 370/310 |
| 2013/0157673 A1 | 6/2013 | Brusilovsky | |
| 2014/0016629 A1* | 1/2014 | Pancorbo Marcos | H04L 12/5692 370/338 |
| 2014/0029420 A1* | 1/2014 | Jeong | H04L 12/5692 370/229 |
| 2014/0086177 A1 | 3/2014 | Adjakple et al. | |
| 2014/0204746 A1 | 7/2014 | Sun et al. | |
| 2014/0348062 A1* | 11/2014 | Anwar | H04W 28/08 370/328 |
| 2015/0055447 A1* | 2/2015 | Jamadagni | H04W 48/02 370/216 |

OTHER PUBLICATIONS

Qutqut M., et al., "Mobility Management in Wireless Broadband Femtocells," Technical Report 2012-590, 2012, 43 pages.

* cited by examiner

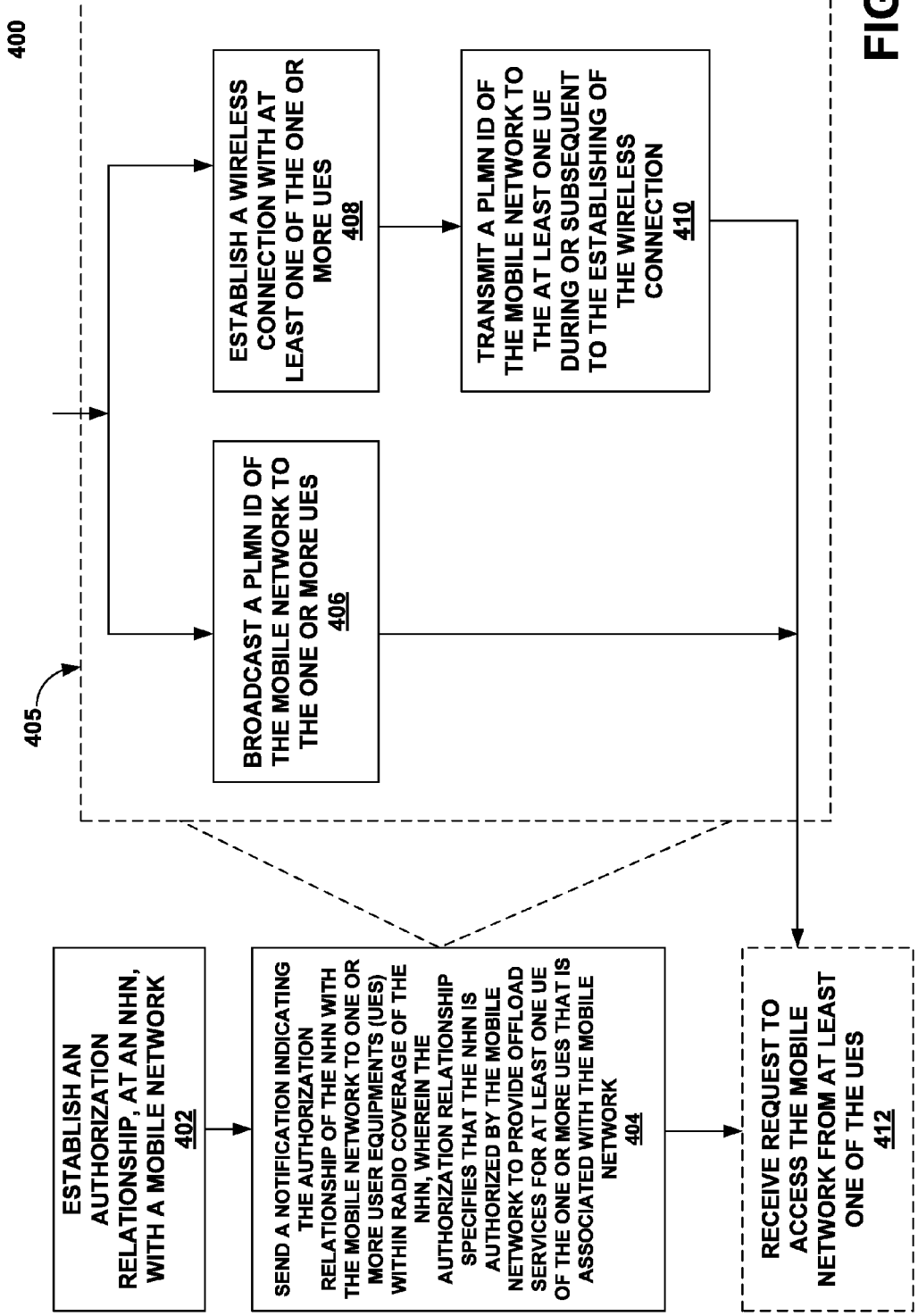

OFFLOAD SERVICES VIA A NEUTRAL HOST NETWORK

CROSS-REFERENCE

This is an application claiming priority to Provisional Application No. 62/061,030 entitled "TECHNIQUES FOR OFFLOAD SERVICES VIA A NEUTRAL HOST NETWORK" filed on Oct. 7, 2014, and assigned to the assignee hereof and hereby expressly incorporated by reference herein.

BACKGROUND

The described aspects relate generally to wireless communication systems. More particularly, the described aspects relate to techniques for providing discoverable offload services via a neutral host network (NHN).

Wireless communication networks are widely deployed to provide various communication services such as telephony, video, data, messaging, broadcasts, and so on. Such networks, which are usually multiple access networks, support communications for multiple users by sharing the available network resources. One example of such a network is UMTS Terrestrial Radio Access Network (UTRAN). UTRAN is the radio access network (RAN) defined as a part of the Universal Mobile Telecommunications System (UMTS), a third generation (3G) mobile phone technology supported by the 3rd Generation Partnership Project (3GPP). UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). UMTS also supports enhanced 3G data communications protocols, such as High Speed Packet Access (HSPA), which provides higher data transfer speeds and capacity to associated UMTS networks. Furthermore, UMTS supports multiple radio access bearer (multi-RAB) capability, which allows simultaneous network communication with a user equipment (UE) over two or more radio access bearers. Therefore, in an aspect, multi-RAB functionality in UMTS allows for a UE to concurrently transmit and receive packet-switched (PS) and circuit-switched (CS) data.

There may be instances in which a mobile network may find it difficult to provide network services and/or a certain level of quality of service to subscribers of the mobile network. For example, in large gatherings, such as sporting events or concerts, the mobile network may not have the capacity to provide network services to all subscribers that want those services. As such, it may be desirable if another network can provide network services to offload the mobile network such that the subscriber experience may be improved.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure presents examples of techniques for providing offload services via a neutral host network (NHN). An example method may include establishing an authorization relationship, at the NHN, with a mobile network. In addition, the example method may include sending a notification indicating the authorization relationship of the NHN with the mobile network to one or more user equipments (UEs) within radio coverage of the NHN, wherein the authorization relationship specifies that the NHN is authorized by the mobile network to provide offload services for at least one UE of the one or more UEs that is associated with the mobile network.

An example method for receiving offload services via an NHN may include receiving a notification from the NHN that indicates an authorization relationship of the NHN with a mobile network, wherein the authorization relationship specifies that the NHN is authorized to provide offload services associated with the mobile network. In addition, the example method may include submitting credentials associated with the mobile network to the NHN to establish a connection with the NHN. Further, the example method may include accessing one or more data services through the connection via the offload services provided by the NHN.

Another example method may include establishing a first authorization relationship, at the NHN, with a first mobile network. In addition, the example method may include establishing a second authorization relationship, at the NHN, with a second mobile network. Further, the example method may include sending a notification indicating the first and second authorization relationships of the NHN with the first and second mobile network, respectively, to one or more user equipments (UEs) within radio coverage of the NHN, wherein the first authorization relationship specifies that the NHN is authorized by the first mobile network to provide offload services for a first subset of UEs from the one or more UEs that are associated with the first mobile network, and wherein the second authorization relationship specifies that the NHN is authorized by the second mobile network to provide offload services for a second subset of UEs from the one or more UEs that are associated with the second mobile network.

An example apparatus for providing offload services via an NHN may include means for means for establishing an authorization relationship, at the NHN, with a mobile network. In addition, the example apparatus may include means for sending a notification indicating the authorization relationship of the NHN with the mobile network to one or more user equipments (UEs) within radio coverage of the NHN, wherein the authorization relationship specifies that the NHN is authorized by the mobile network to provide offload services for at least one UE from the one or more UEs that is associated with the mobile network.

Another example apparatus providing offload services via an NHN may include a an authorization manager configured to establish an authorization relationship, at the NHN, with a mobile network. In addition, the example apparatus may include a notification controller configured to send a notification indicating the authorization relationship of the NHN with the mobile network to one or more user equipments (UEs) within radio coverage of the NHN, wherein the authorization relationship specifies that the NHN is authorized by the mobile network to provide offload services for at least one UE of the one or more UEs that is associated with the mobile network.

An example computer-readable medium storing computer executable code for providing offload services via an NHN may include code for establishing an authorization relationship, at the NHN, with a mobile network. In addition, the computer-readable medium may include code for sending a notification indicating the authorization relationship of the NHN with the mobile network to one or more user equipments (UEs) within radio coverage of the NHN, wherein the authorization relationship specifies that the NHN is authorized by the mobile network to provide offload services for at least one UE of the one or more UEs that is associated with the mobile network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a flow chart of a method of wireless communication in which offload services via an NHN may be provided;

DETAILED DESCRIPTION

Figure 1:
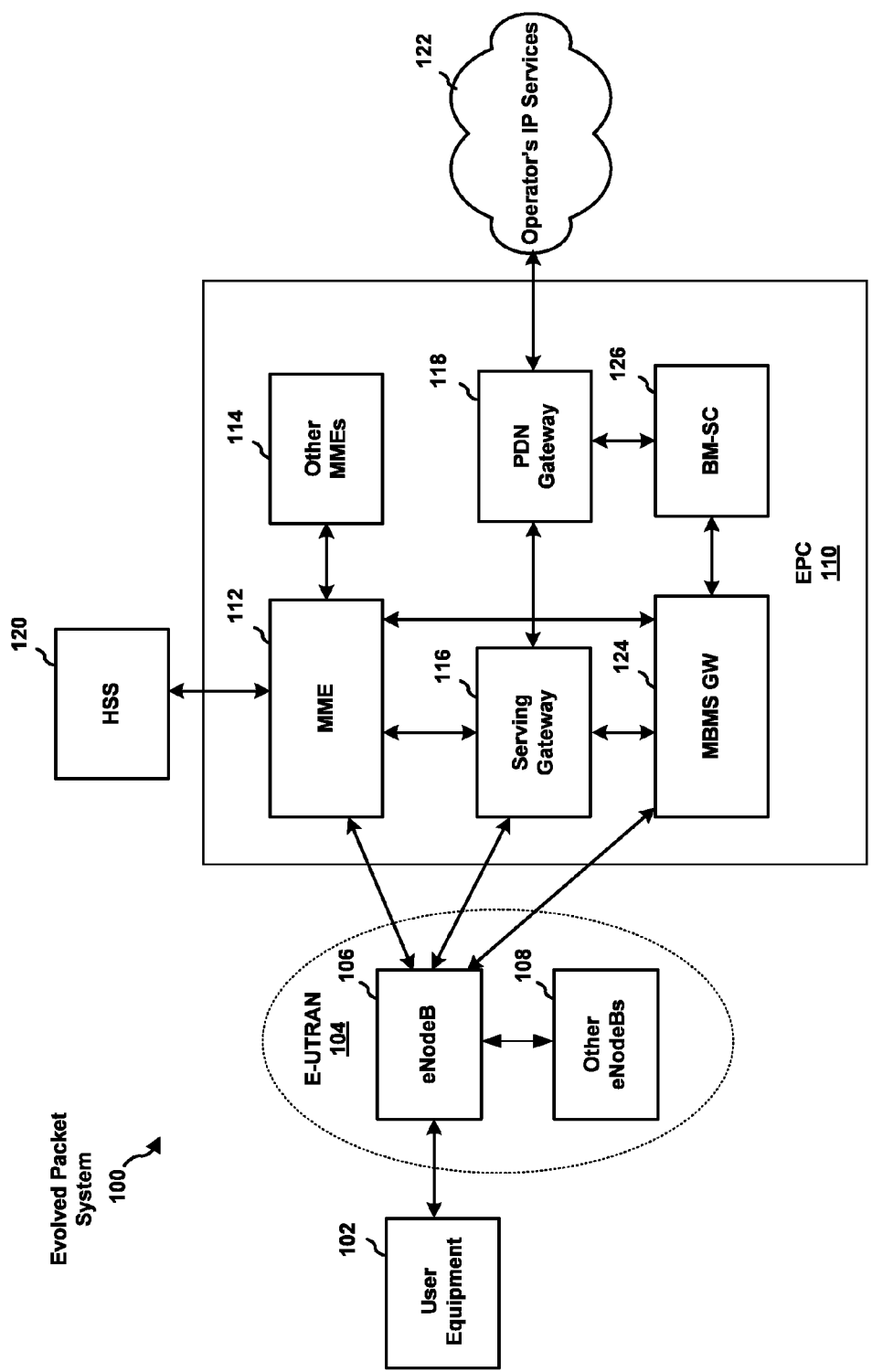
FIG. 1 is a diagram illustrating an example of network architecture in which offload services via an NHN may be provided.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

A mobile network may provide networks services to one or more UEs that subscribe to the network services. Additionally, a "neutral host network" (NHN) that supports LTE may also provide data communications between the one or more UEs and the mobile network. In at least some examples, the mobile network and the NHN may be owned by different business entities and may form an agreement indicating that the NHN may provide services to offload the direct communications between the UEs and the mobile network.

As used herein, a "neutral host network" (NHN) may refer to an LTE-based wireless network that provides internet connectivity service to the one or more UEs within its coverage by allowing scalable self contained network deployments that can service the UEs from multiple service providers of multiple mobile networks. In some other examples, the NHN may be based on LTE or LTE in Unlicensed (LTE-U) radio technologies and may also support Wi-Fi and other radio technologies. The NHN may provide its own network identity to the UEs such that the UEs may discover the availability of the internet connectivity service.

In addition to providing its own network identity to the UEs—the NHN may also inform the UEs about the Public Land Mobile Network (PLMN)-IDs for which mobile network operator (MNO) offload service is available via the NHN. This information of the Home Mobile Network PLMN-IDs for which offload service is available via the NHN may be provided via the system information block (SIB) messages broadcasted by the NHN and/or it may be provided to the UEs in point-to-point fashion during or after the connection establishment. The broadcast based delivery means for this information may be to use the SIB1, e.g., the PLMN-ID list information element (encoded in a proprietary way). The point-to-point delivery may be to use NAS signaling, e.g., the ePLMN-ID fields (encoded in a proprietary way). Other delivery means may include other system information blocks (SIB) and usage of service discovery protocols.

An NHN may be typically deployed within a venue, e.g., an enterprise, a neighborhood, a vehicle, a home, a small/medium-sized business, or in any other premises. Each NHN may typically be deployed and operated separately and independently of other NHNs and of any mobile networks. That is, an NHN deployed by one operator may be different from the operator of any other mobile networks or other NHNs. For example, the NHN of an enterprise may be operated and maintained by the information technology (IT) staff of the enterprise.

In addition, each NHN may include self contained radio access and core network functions. Typically, the core network implementation of an NHN may be a scaled-down version that can be deployed to support the specific NHN deployment. The core network of the NHN may be located on site, in suitable transport aggregation point, at individual eNB of the NHN, and/or in the cloud. An NHN may typically allow the UEs to connect based on authentication, authorization, and/or accounting (AAA) procedures via a local or remote AAA/Home Subscriber Server (HSS) sever. An NHN may support Extensible Authentication Protocol (EAP) authentication which allows the UEs to use a variety of mechanisms, such as EAP-Authentication and Key Agreement (AKA), EAP-Transport Layer Security (TLS), or EAP-Tunneled Transport Layer Security (TTLS). Furthermore, an NHN may allow users to sign up for service by interacting with a service portal. The NHN may also support technology that allows deployment with limited integration, tuning and configuration effort, e.g., relying on Self Organizing Network (SON) features.

The offload services provided by the NHN may refer to data services considered as a secondary data service for the UEs. The UEs may use the offload services to transmit and receive data as an alternative to transmitting and receiving data via a primary access service provided by the mobile network. Offload services may be typically realized as Internet Protocol (IP) connectivity that is separate from the IP connectivity utilized for the primary access service. UEs may switch to offload mode by establishing an offload service connection via the NHN and switching data traffic that can be offloaded to use the established offload service connection. The data traffic that can be offloaded may be, for example, data traffic associated with specific Access Point Name (APN), data traffic associated with specific application(s), data traffic exchanged with certain endpoint(s) or with certain types(s) of traffic. That is, the UEs may select data traffic to offload, e.g., transmit and receive data via the NHN, based on the applications associated with the data traffic, the APN associated with the data traffic, the endpoint(s) that exchange the data traffic, or the types of the data traffic. For example, the UEs may select data traffic related to video streaming to offload but use the primary access service for other types of data traffic.

Typically, the UEs may actively search for the availability of NHNs capable of providing offload services. When an NHN is identified as available, the UEs may connect to the identified NHN. The use of offload services may be controlled by device policies. Depending on the capability of a UE as well as other factors, a UE may be configured to use offload services and the primary access service in parallel (e.g., concurrently), or one at the time (e.g., sequentially or alternately).

Additionally or alternatively, the NHN may notify UEs within radio coverage of the NHN of the availability of the offload service. That is, the NHN may broadcast the public land mobile network (PLMN) identification (ID) of the mobile network to the UEs within radio coverage. As such, the UEs may obtain the information that the UEs may access the mobile network via the NHN. Alternatively, the NHN may establish a connection with one of the UEs and notify the UE of the PLMN ID of the mobile network during or subsequent to the establishing of the connection. Thus, the offload service may be discoverable to the UEs based on the broadcast information or point-to-point transmitted information.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, an appliance, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118.

The PDN Gateway 118 provides UE IP address allocation as well as other functions. The PDN Gateway 118 is connected to the Operator's IP Services 122. The Operator's IP Services 122 may include the internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting enhanced MBMS (eMBMS) related charging information.

In some aspects, a public land mobile network, e.g., VPLMN 702, HPLMN 704, and NHN 706 as shown in FIG. 7A, may implement LTE network architecture 100. For example, NHN 706 may implement LTE network architecture 100 to provide radio coverage in an area such as an enterprise, a stadium, a shopping mall, or a restaurant while HPLMN 704 implements LTE network architecture 100 to cover a broader area. However, HPLMN 704 may not provide sufficient services to the UEs in the crowded area such as a stadium. As such, the UEs located in the area may need to connect to the internet via an alternative network such as NHN 706. NHN 706, which may be operated by a third party hosting a sport event in the stadium, may provide offload services for the UEs to connect to the internet. In some aspects, the UEs may be further connected to HPLMN 704 indirectly via the internet.

Figure 2:
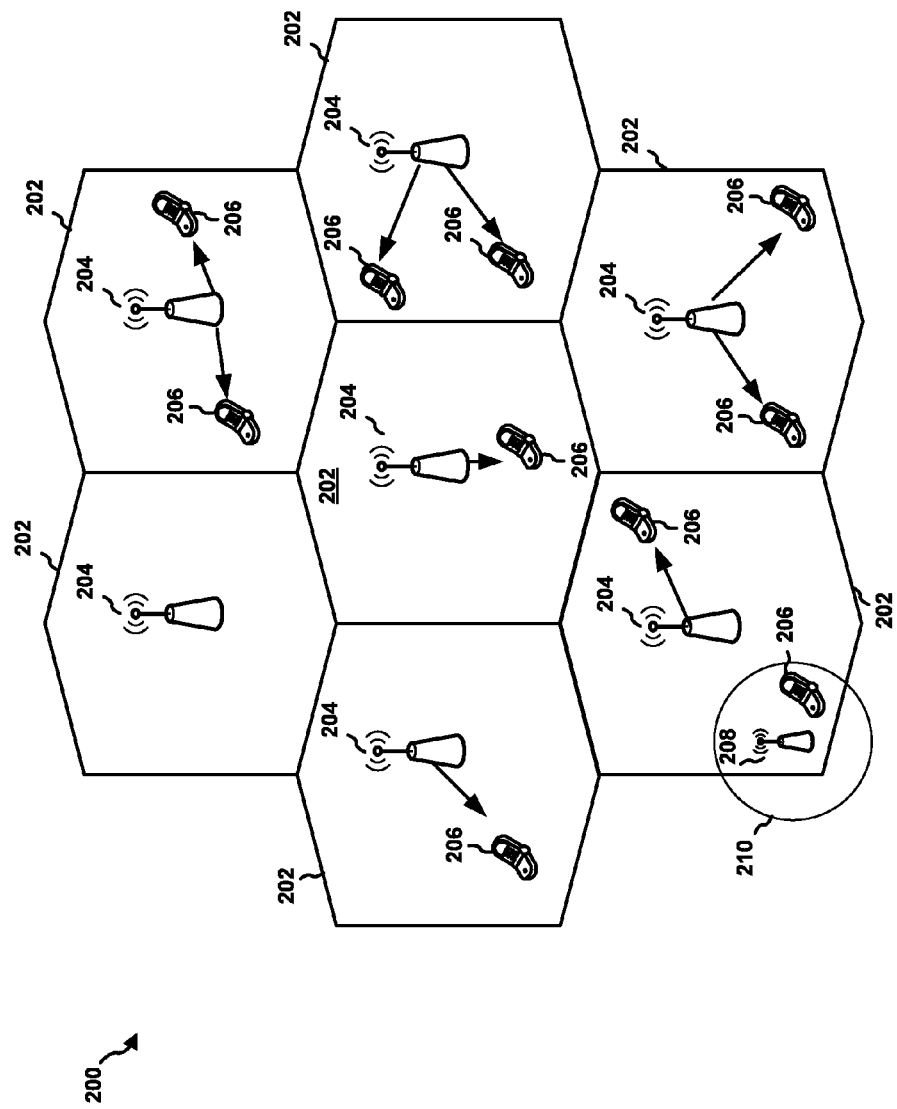
FIG. 2 is a diagram illustrating an example of an access network in which offload services via an NHN may be provided.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be generally referred to as a "small cell" and may include a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations.

The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving a particular coverage area. Further, the terms "eNB," "base station," and "cell" may be used interchangeably herein. The term "small cell" may refer to an access point or base station, or to a corresponding coverage area of the access point or base station, where the access point or base station in this case has a relatively low transmit power or relatively small coverage as compared to, for example, the transmit power or coverage area of a macro network access point or macro cell. For instance, a macro cell may cover a relatively large geographic area, such as, but not limited to, several kilometers in radius. In contrast, a small cell may cover a relatively small geographic area, such as, but not limited to, a home, a building, or a floor of a building. Therefore, the term "small cell," as used herein, refers to a relatively low transmit power and/or a relatively small coverage area cell as compared to a macro cell.

The modulation and multiple access scheme employed by the access network 200 may vary depending on the particular telecommunications standard being deployed. In LTE applications, OFDM is used on the downlink (DL) and SC-FDMA is used on the uplink (UL) to support both frequency division duplex (FDD) and time division duplex (TDD).

As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR). In some aspects, at least portions of access network 200 may be utilized in connection with techniques described herein for providing offload services by an NHN.

As demand for mobile data continues to increase, local area networks (e.g., WiFi™) are being increasingly used to offload data traffic from wide area networks (WANs) (e.g., LTE, WCDMA). For example, based on the 3GPP WiFi™ interworking architecture and Hotspot 2.0 specifications, solutions where a WiFi™ connection is established using a mobile network operator (MNO) SIM are becoming increasingly pervasive. As used herein, the term "MNO" may also be referred to as a wireless service provider, a wireless carrier, a cellular company, or a mobile network carrier. For example, when a UE (also referred to as an "MNO device") that is in communication with an MNO WAN connects to a WiFi™ network, the MNO WAN connection is maintained and serves both as a fallback data connection (e.g., if/when WiFi™ is no longer available) and/or as the connection for receiving voice and other MNO services independently of the WiFi™ network.

Typically, small cells (e.g., femtocells, picocells, microcells) are deployed by MNOs and are considered to be extensions of the MNO WAN. The small cells deployed by an MNO may perform a handover between a small cell of the MNO and a macro cell of the MNO, similar to a handover between two macrocells of an MNO. Small cells may be deployed by entities other than MNOs, such as cable television companies, as independent small cell networks. Such independent small cell networks may provide opportunistic low cost offload data services to UEs in a manner similar to the offload data services provided by WiFi™ networks. For example, a UE in communication with an MNO WAN (e.g., an LTE network) may be able to offload data services by concurrently communicating with a WiFi™ network.

A reduction in costs may be achieved via unplanned deployments of small cells by entities other than MNOs and by reusing the existing backhaul and sites (e.g. residential) of such entities. These small cells would not be considered as extensions of MNO macro networks, but rather would be considered independent opportunistically available offload networks. Moreover, these small cells would not replace a main MNO WAN (e.g., an LTE network) connection. For example, based on wholesale roaming agreements between MNOs and cable television entities, UEs would opportunistically connect to small cells deployed by cable television entities and, when connected, the UEs would route most data traffic via the small cells instead of the MNO WAN network. Therefore, in this example, the small cells deployed by the cable television entities would serve as a low cost offload network. In one configuration, the UEs may connect and disconnect to such offload networks without influencing the MNO WAN connection. In such a configuration, for example, the radio connection between a UE and a small cell and the radio connection between the UE and the MNO WAN may coexist.

Figure 3A:
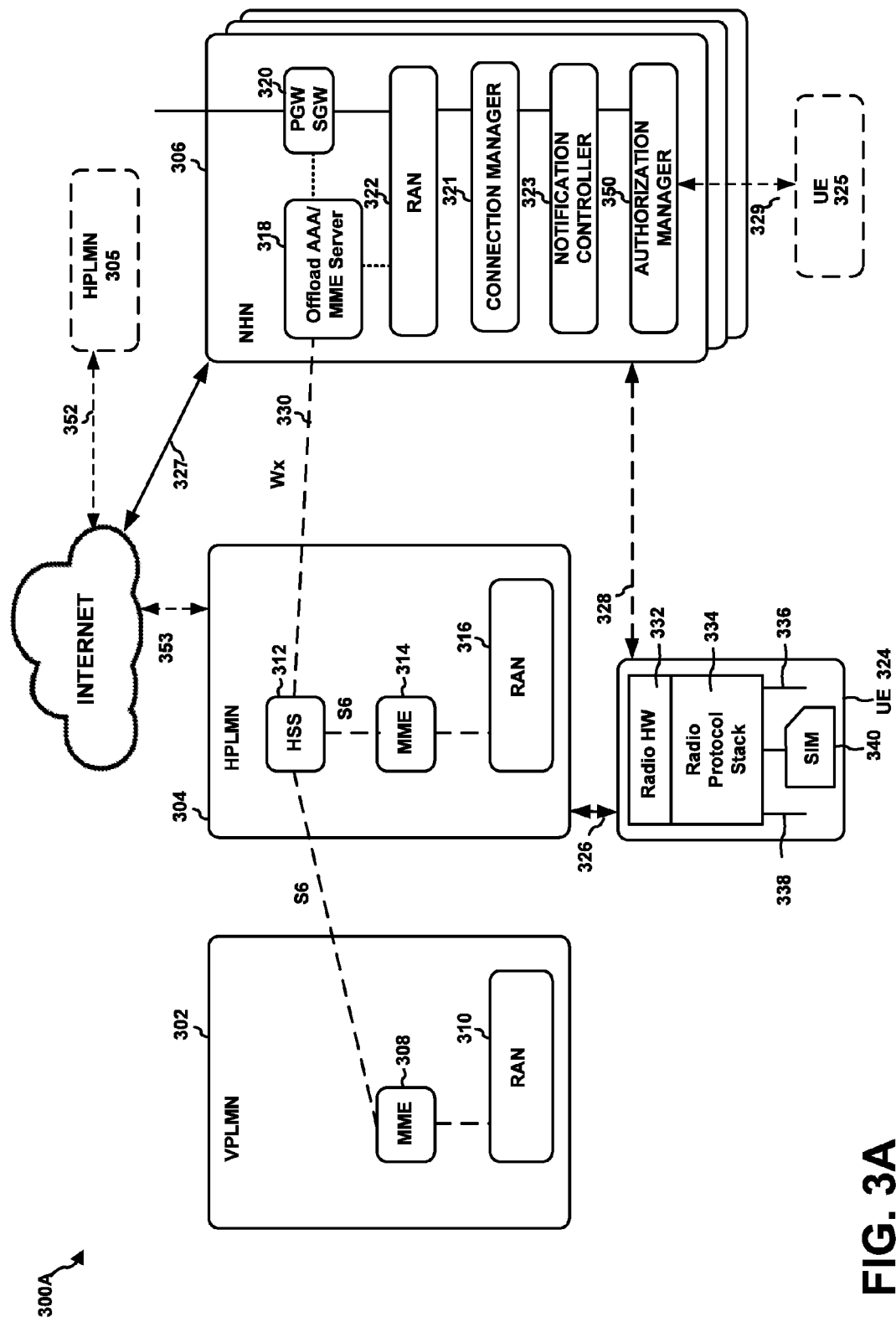
FIG. 3A is a diagram illustrating a wireless communication system in which offload services via an NHN may be provided.

FIG. 3A is a diagram illustrating a wireless communication system 300A. The wireless communication system 300 includes a visited public land mobile network (VPLMN) 302, a home public land mobile network (HPLMN) 304, a neutral host network (NHN) 306, and a UE 324. UE 324 may refer to a mobile device located within radio coverage of NHN 306. Further, UE 324 may have subscribed to one or more services provided by HPLMN 304, e.g., access to the internet via an LTE network provided by HPLMN 304.

In some alternative examples, wireless communication system 300A may further include an HPLMN 305 and a UE 325. HPLMN 305 may include components and features identical to HPLMN 304; UE 325 may include components and features identical to UE 324. However, UE 325 may refer to a mobile device within radio coverage of NHN 306 but only have the subscription to services provided by HPLMN 305 rather than HPLMN 304.

In an aspect, the HPLMN 304 may be a WAN (e.g., a 3GPP LTE network or a WCDMA network) deployed by a first MNO, the VPLMN 302 may be a WAN (e.g., a 3GPP LTE network or a WCDMA network) deployed by a second MNO that is different from the first MNO, and the NHN 306 may be a collection of small cells based on WAN technologies (e.g., 3GPP LTE network or WCDMA network) deployed by an entity other than an MNO, such as a cable television company. As referenced herein, an offload public land mobile network may be interchangeably referred to as a neutral host network (NHN).

As shown in FIG. 3A, the HPLMN 304 includes a home subscriber server (HSS) 312, an MME 314, and a radio access network (RAN) 316. The VPLMN 302 includes an MME 308 and a RAN 310. The NHN 306 includes an offload authentication, authorization, and accounting (AAA)/MME server 318, a packet data network gateway (PGW)/serving gateway (SGW) 320, a connection manager 321, a RAN 322, a notification controller 323, and an authorization manager 350.

As shown in FIG. 3A, the UE 324 may include radio hardware 332, radio protocol stack 334, an IP interface 338 for transmission or reception of IP data packets to or from the HPLMN 304, an IP interface 336 for transmission or reception of IP data packets to or from the NHN 306, and a SIM card 340. In an aspect, the SIM card 340 includes a subscriber identifier associated with the HPLMN 304. For example, the subscriber identifier may be a 3GPP international mobile subscriber identity (IMSI) associated with the SIM card 340.

As shown in FIG. 3A, the HSS 312 may communicate with the MME 308 of the VPLMN 302 via an S6 interface. The HSS 312 may further communicate with the offload AAA/MME server 318 of the NHN 306 via interface 330. In some aspects, the interface 330 does not involve the use of an interface conventionally used for communication between two PLMNs, such as an S6 interface. For example, the interface 330 may be a Wx interface used for authentication of users of wireless local area network (WLAN) access when they connect to the WLAN network using a SIM card. In such aspect, the Wx interface that is typically used in relation to WLAN interworking may be applied for interworking between the HPLMN 304 and NHN 306 in a manner similar to the way the Wx interface is applied for WLAN interworking. In an aspect, the RAN 310, RAN 316, and RAN 322 may each include an eNB that is configured to communicate with the UE 324 using a wireless communication protocol, such as LTE or WCDMA.

As shown in FIG. 3A, the UE 324 may establish a wireless communication link 326 with the HPLMN 304 via the RAN 316. It should be understood that the term "wireless communication link" may also be referred to as a "cellular communication link." For example, the UE 324 may establish the wireless communication link 326 by attaching (also referred to as "registering") to a 3GPP network, connecting to an internet access point name (APN), establishing a packet data protocol (PDP) context, and establishing a default bearer. In the configuration of FIG. 3A, the wireless communication link 326 may be established based on the subscriber identifier of the UE 324. In an aspect, the subscriber identifier of the UE 324 may be associated with the cellular network of the HPLMN 304. The wireless communication link 326 may be configured to support wireless communication between the RAN 316 and the UE 324 based on a 3GPP LTE or WCDMA wireless communication protocol.

As further shown in FIG. 3A, NHN 306 may establish a wireless communication link 328 with the UE 324 and a communication link 327 to the internet. In an aspect, the offload AAA/MME server 318 may receive authentication information for the UE 324, authorization information for the UE 324, subscriber information for the UE 324, and/or accounting information for the UE 324 from the HSS 312 via the Wx interface 330. The UE 324 may establish the wireless communication link 328 by attaching to a 3GPP network, connecting to an Internet APN, establishing a PDP context, and establishing a default bearer. In the configuration of FIG. 3A, the wireless communication link 328 may be established based on the same subscriber identifier of the UE 324. The wireless communication link 328 may be configured to support wireless communication between the RAN 322 and the UE 324 based on a 3GPP LTE or WCDMA wireless communication protocol.

In an aspect, the HSS 312 is configured to provide information to the offload AAA/MME 318 for enabling the NHN 306 to establish the wireless communication link 328 with the UE 324 without disconnecting the UE 324 from the HPLMN 304. Accordingly, the UE 324 may concurrently maintain the wireless communication links 326 and 328 and may concurrently communicate with the HPLMN 304 and the NHN 306. In an aspect, the UE 324 may offload data traffic from the HPLMN 304 to the NHN 306. For example, the UE 324 may be in communication with the HPLMN 304 via the wireless communication link 326 while the UE 324 communicates data (e.g., transmission and/or reception of IP data packets) with the NHN 306 via the wireless communication link 328. It should be understood that the HPLMN 304 may continue to function as the serving MNO WAN for the UE 324 after the UE 324 has established the wireless communication link 328 with the NHN 306.

In an aspect, the NHN 306 may be configured to not register itself as the serving PLMN towards the HPLMN 304 when a UE 324 establishes the wireless communication link to the NHN 306. Accordingly, the offload AAA/MME server 318 may maintain the wireless communication link state with the UE 324 on its own without relying on any involvement from HPLMN 304 or HSS 312 for the wireless communication link management between itself and the UE 324.

In an aspect, the radio protocol stack 334 of the UE 324 may be configured as a dual radio protocol stack such that the UE 324 maintains a state of the radio protocol stack 334 with respect to the HPLMN 304 and a state of the radio protocol stack 334 with respect to the NHN 306. Accordingly, the UE 324 may manage a first instance of the radio protocol stack 334 for communication with the HPLMN 304 and a second instance of the radio protocol stack 334 for communication with the NHN 306. The UE 324 may transmit or receive a first IP data packet to or from the HPLMN 304 via the IP interface 338 and may transmit or receive a second IP data packet to or from the NHN 306 via the IP interface 336. In an aspect, the UE 324 may dynamically select whether to use the IP interface 336 or the IP interface 338 for transmitting an IP data packet. For example, such dynamic selection by the UE 324 may be based on at least a characteristic associated with each of IP interfaces 336 and 338, a state of the first and/or second wireless communication links 326, 328, an expected communication quality via the IP interfaces, a policy on network usage and user input. The radio hardware 332 may be a shared radio hardware resource that is configured to support wireless communication concurrently with two different PLMNs (e.g., HPLMN 304 and NHN 306).

In an aspect, the UE 324 may maintain a first security context for communication with the HPLMN 304 and may maintain a second security context for communication with the NHN 306. For example, the first security context may be maintained within the SIM card 340 of the UE 324 and the second security context may be maintained outside of the SIM card 340.

It should be noted that in FIG. 3A, the UE 324 is assumed to be served simultaneously by the HPLMN 304 and the NHN 306, but the same principles apply in the case where the UE 324 is served simultaneously between a VPLMN 302 or an HPLMN 305 and the NHN 306. For example, if the UE 324 moves into an area covered by the VPLMN 302, the UE 324 may establish a wireless communication link (not shown in FIG. 3A) with the VPLMN 302. In this example, the HSS 312 may provide information to the MME 308 via the S6 interface for establishing such wireless communication link and may disconnect the wireless communication link 326 after the wireless communication link with the VPLMN 302 is established. In an aspect, the UE 324 may still maintain the wireless communication link 328 concurrently with the wireless communication link established with the VPLMN 302. In another aspect the UE may maintain only one radio link at a time, but maintain simultaneous logical relationship (e.g. remain attached) with the HPLMN 304 (or VPLMN 302) and the NHN 306. In a further aspect the UE may maintain only one logical relationship (e.g. remain attached) with either the HPLMN 304 (or VPLMN 302) or the NHN 306.

In some aspects, authorization manager 350 or offload AAA/MME server 318 may establish an authorization relationship with HPLMN 304. The authorization relationship indicates that NHN 306 is authorized to provide offload services, e.g., access to the internet, to those UEs subscribed to services provided by HPLMN 304. Such authorization relationship may be established based on a business agreement between the operator of HPLMN 304 and the provider of NHN 306.

Further, notification controller 323 of NHN 306 may be configured to send a notification to the UEs within radio coverage of NHN 306 including UE 324, and thus, the offload services provided by NHN 306 may become discoverable to the UEs including UE 324. The notification may indicate that NHN 306 is authorized by HPLMN 304 to provide offload services associated with HPLMN 304. For example, the notification may indicate that UEs that subscribed to HPLMN 304's services may access the internet via connections provided by NHN 306. The connections may include communication link 327 between the internet and NHN 306, wireless communication link 328 between UE 324 and NHN 306, and wireless communication link 329 between UE 325 and NHN 306. Such connections may be established and maintained by connection manager 321 included in NHN 306.

For example, notification controller 323 may be configured to broadcast a PLMN identification (ID) of HPLMN 304 to the UEs within the radio coverage of NHN 306. The PLMN ID of HPLMN 304 may be included in a system information block (SIB). In another example, the PLMN ID may be transmitted to a target UE, e.g., UE 324, within the radio coverage of NHN 306 via wireless communication link 328. Notification controller 323 may then transmit the PLMN ID of HPLMN 304 to UE 324 during or subsequent to the establishing of wireless communication link 328. Further, the PLMN ID may be transmitted to UE 324 in a Non-Access Stratum (NAS) message.

In at least some aspects, connection manager 321 and notification controller 323 may be utilized to support the various techniques for offload services provided by an NHN, e.g., NHN 306.

Figure 3B:
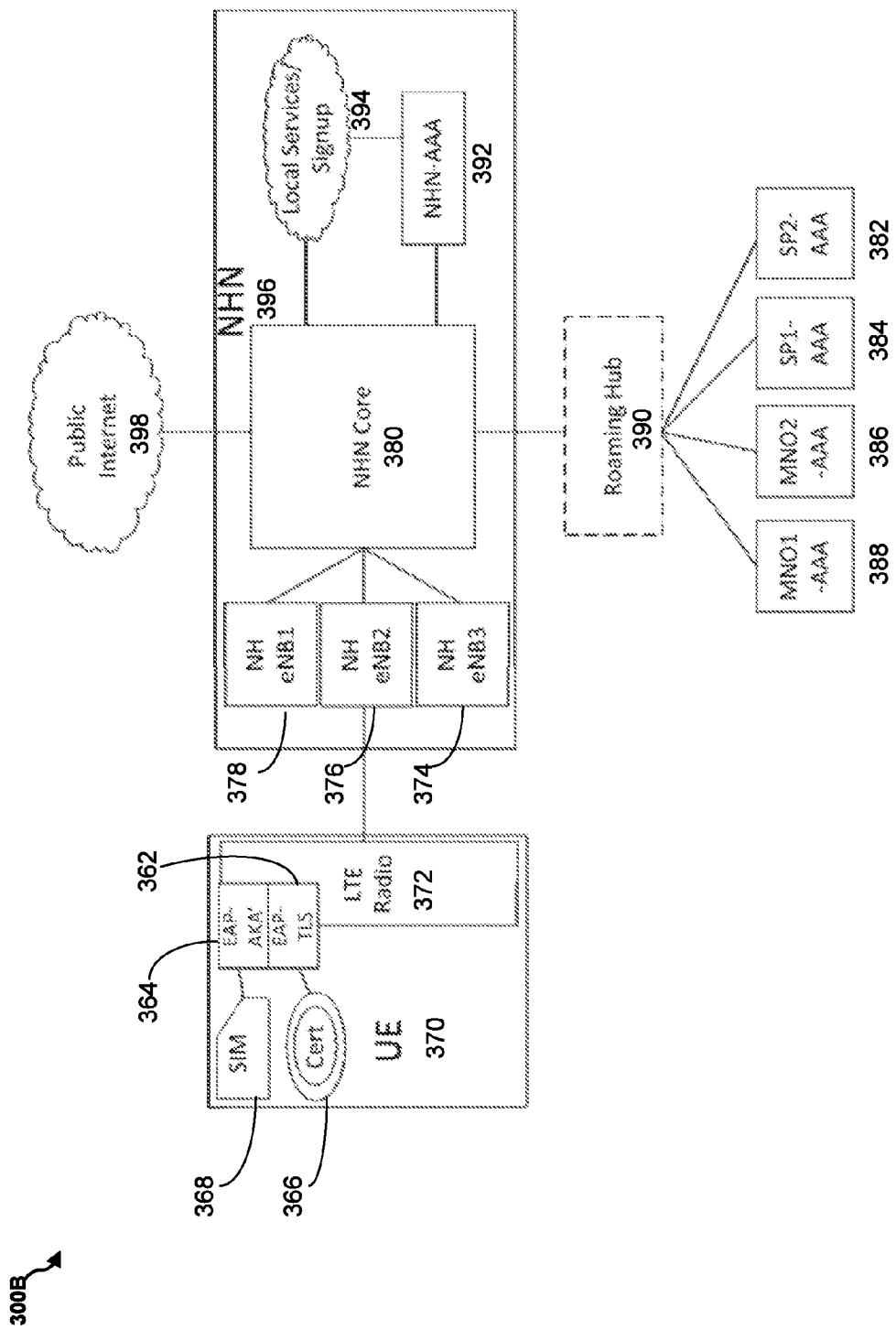
FIG. 3B is a diagram illustrating an NHN in which offload services may be provided.

FIG. 3B is a diagram illustrating an NHN 396 in which offload services may be provided. As depicted, NHN 396 may be configured to provide access to public internet 398 for UE 370. An LTE radio 372 of UE 370 may be in communication with NHN 396 via a connection with neutral host (NH) eNB2 376.

UE 370 may further include a subscriber identification module (SIM) 368, a Cert 366, an EAP-AKA' 364, and an EAP-TLS 362, which may provide information at least including the identification of UE 370 for NHN 396. Based on the information of UE 370, NHN core 380, together with local services/signup 394 and NHN-AAA 392, may authenticate UE 370 that UE 370 has subscribed the offload services provided by NHN 396.

In addition, roaming hub 390 may be configured to replace bilateral roaming relationship agreements between mobile operators with one agreement and one connection to a single roaming hub provider. Roaming hub 390 may further include a mobile network operator (MNO)1-AAA 388, an MNO2-AAA 386, a service provider (SP)1-AAA 384, and a SP2-AAA 382.

Referring to FIG. 4, aspects of a method 400 for providing offload services via an NHN may be performed by NHN 306 of FIG. 3A. In an aspect, NHN 306 may provide data communications between UE 324 and the internet. More particularly, aspects of method 400 may be performed by connection manager 321, notification controller 323, and authorization manager 350 as shown in FIG. 3A. As illustrated in FIG. 4, dash-lined blocks may indicate optional operations of aspects of method 400.

At 402, method 400 includes establishing an authorization relationship, at the NHN, with a mobile network. For example, authorization manager 350 may be configured to establish an authorization relationship with HPLMN 304.

At 404, method 400 includes sending a notification indicating the authorization relationship of the NHN with the mobile network to one or more user equipments (UEs) within radio coverage of the NHN, wherein the authorization relationship specifies that the NHN is authorized by the mobile network to provide offload services for at least one UE of the one or more UEs that is associated with the mobile network. For example, notification controller 323 of NHN 306 may be configured to send a notification to UE 324 to indicate that NHN 306 is authorized to provide data connectivity between UE 324 and the internet.

Additionally, as shown in FIG. 4, dashed box 405 indicates that 406-410 can provide additional details with regards to 404. For instance, at 406, method 400 includes broadcasting a public land mobile network (PLMN) identification of the mobile network to the one or more UEs. For example, notification controller 323 may be configured to broadcast a PLMN identification (ID) of HPLMN 304 to one or more UEs within the radio coverage of NHN 306. The PLMN ID of HPLMN 304 may be included in a system information block (SIB).

At 408, method 400 includes establishing a wireless connection with at least one UE of the one or more UEs. For example, connection manager 321 may be configured to establish wireless communication link 328 with UE 324.

At 410, method 400 includes transmitting a PLMN identification of the mobile network to the at least one UE of the one or more UEs during or subsequent to the establishing of the wireless connection. For example, notification controller 323 may transmit the PLMN ID of HPLMN 304 to UE 324 during or subsequent to the establishing of wireless communication link 328. Further, the PLMN ID may be transmitted to UE 324 in a Non-Access Stratum (NAS) message.

At 412, method 400 includes receiving requests to access the mobile network from the at least one UE. For example, UE 324, after discovering the availability of the offload services provided by NHN 306, may submit a request to access the internet. The request may include credentials regarding the subscription to the services provided by HPLMN 304. With these credentials, NHN 306 may be configured to authenticate that UE 324 has subscribed to the services and grant access to the internet for UE 324. In at least some examples, the credentials may be stored in a data storage associated with SIM card 340.

Figure 5:
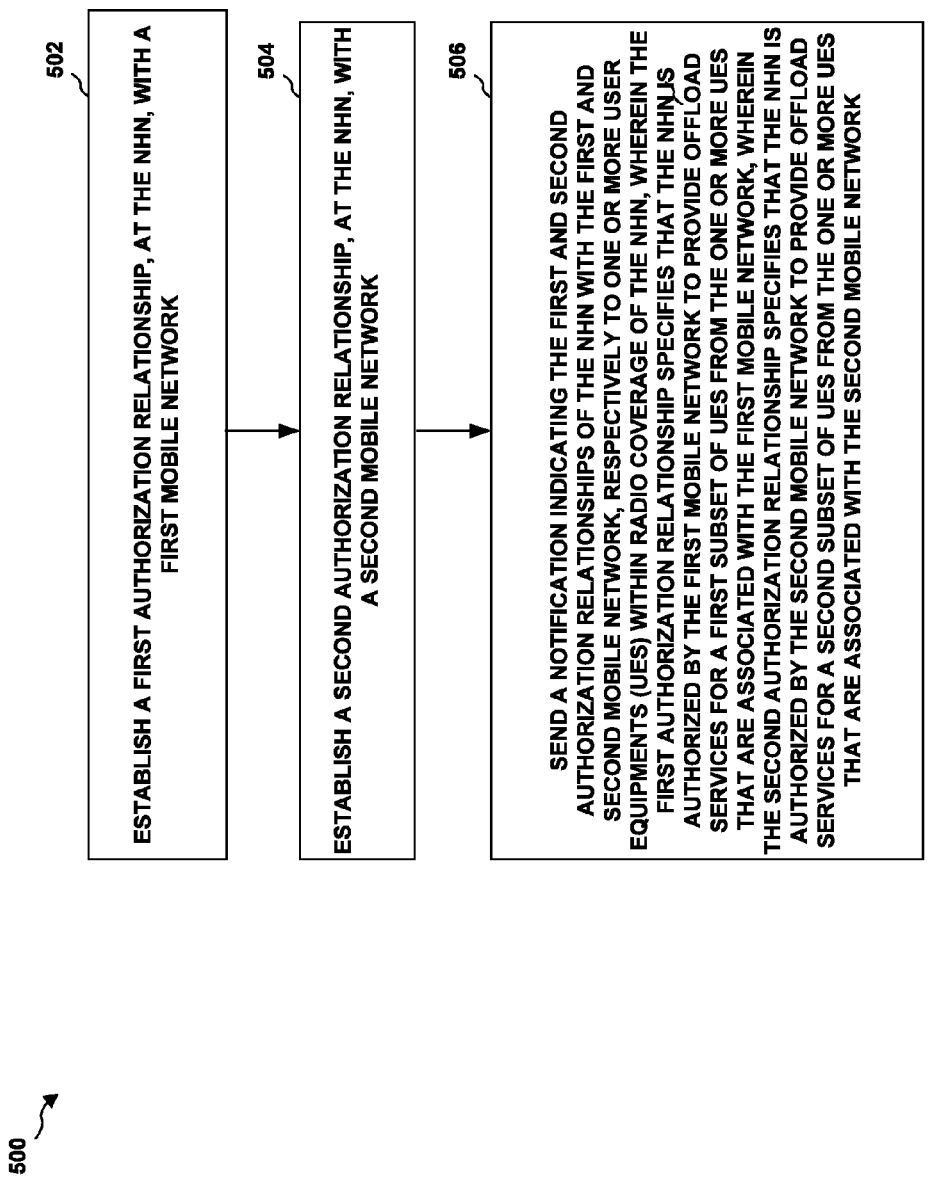
FIG. 5 is a flow chart of another method of wireless communication in which offload services via an NHN may be provided.

Referring to FIG. 5, aspects of a method 500 for providing offload services via an NHN may be performed by NHN 306 of FIG. 3A. In an aspect, NHN 306 may provide offload services between UE 324 and the internet. More particularly, aspects of method 500 may be performed by connection manager 321, notification controller 323, and authorization manager 350 as shown in FIG. 3A.

At 502, method 500 includes establishing a first authorization relationship, at the NHN, with a first mobile network. For example, authorization manager 350 may be configured to establish the first authorization relationship between NHN 306 and HPLMN 304. The first authorization relationship may indicate that NHN 306 is authorized to provide offload services to UEs that have subscribed to data services, e.g., access to the internet, provided by HPLMN 304.

At 504, method 500 includes establishing a second authorization relationship, at the NHN, with a second mobile network. For example, authorization manager 350 may be configured to establish the second authorization relationship between NHN 306 and HPLMN 305. Similar to the first authorization relationship, the second authorization relationship may indicate that NHN 306 is also authorized to provide offload services to UEs that have subscribed to data services provided by HPLMN 305.

At 506, method 500 includes sending a notification indicating the first and second authorization relationships of the NHN with the first and second mobile network, respectively, to one or more user equipments (UEs) within radio coverage of the NHN, wherein the first authorization relationship specifies that the NHN is authorized by the first mobile network to provide offload services for a first subset of UEs from the one or more UEs that are associated with the first mobile network, wherein the second authorization relationship specifies that the NHN is authorized by the second mobile network to provide offload services for a second subset of UEs from the one or more UEs that are associated with the second mobile network. For example, notification controller 323 may send the notification that includes the PLMN IDs of HPLMN 304 and 305 to one or more UEs within the radio coverage of NHN 306. The notification may further indicate that NHN 306 is authorized to provide offload services for UE 324 to access the internet and offload services for UE 325 to access the internet. As described above, HPLMN 305 may include components and features identical to HPLMN 304; UE 325 may include components and features identical to UE 324. However, UE 325 may refer to a mobile device within radio coverage of NHN 306 but only have the subscription to services provided by HPLMN 305 rather than HPLMN 304.

Figure 6:
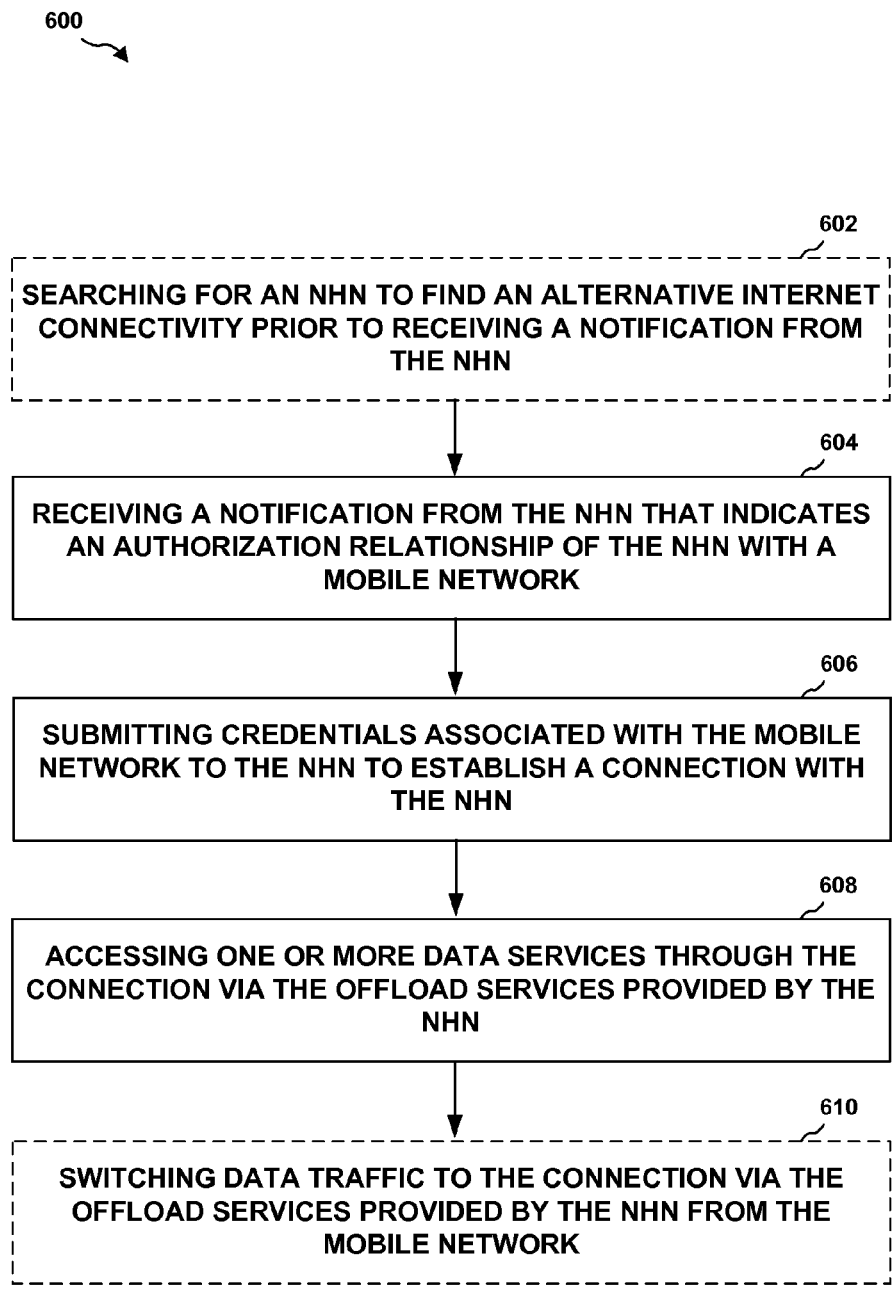
FIG. 6 is a flow chart of another method of wireless communication in which offload services via an NHN may be provided.

Referring to FIG. 6, aspects of a method 600 for receiving offload services via an NHN may be performed by UE 324 of FIG. 3A. As referenced herein, a dash lined box may refer to an optional operation of aspects of method 600.

At 602, method 600 includes searching for the NHN to find an alternative internet connectivity prior to receiving a notification from the NHN. For example, UE 324 may be configured to search for NHN 306 to find an alternative internet connectivity to a primary access service to HPLMN 304 via wireless communication link 326.

At 604, method 600 includes receiving a notification from the NHN that indicates an authorization relationship of the NHN with a mobile network, wherein the authorization relationship specifies that the NHN is authorized to provide offload services associated with the mobile network. For example, UE 324 may receive a notification from notification controller 323 of NHN 306, and thus, UE 324 may discover the offload services provided by NHN 306. The notification may indicate that NHN 306 is authorized by HPLMN 304 to provide offload services associated with HPLMN 304. For example, the notification may indicate that UEs that subscribed to HPLMN 304's services may access the internet via connections provided by NHN 306. The connections may include communication link 327 between the internet and NHN 306, wireless communication link 328 between UE 324 and NHN 306, and wireless communication link 329 between UE 325 and NHN 306. Such connections may be established and maintained by connection manager 321 included in NHN 306.

At 606, method 600 includes submitting credentials associated with the mobile network to the NHN to establish a connection with the NHN. For example, UE 324, after discovering the availability of the offload services provided by NHN 306, may submit a request to access the internet. The request may include credentials regarding the subscription to the services provided by HPLMN 304. With these credentials, NHN 306 may be configured to authenticate that UE 324 has subscribed to the services and grant access to the internet for UE 324. In at least some examples, the credentials may be stored in a data storage associated with SIM card 340.

At 608, method 600 includes accessing one or more data services through the connection via the offload services provided by the NHN. For example, when the credentials of UE 324 is authenticated by NHN 306, UE 324 may access the one or more data services through wireless communication link 328.

At 610, method 600 includes switching data traffic to the connection via the offload services provided by the NHN from the mobile network. That is, UE 324 may switch some portion of the data traffic to the connection via the offload services provide by NHN 306. In other words, UE 324 may select data traffic to offload, e.g., transmit and receive via the NHN, based on the applications associated with the data traffic, the APN associated with the data traffic, the endpoint(s) that exchange the data traffic, or the types of the data traffic. For example, the UEs may select data traffic related to video streaming to offload but use the primary access service for other types of data traffic.

Figure 7:
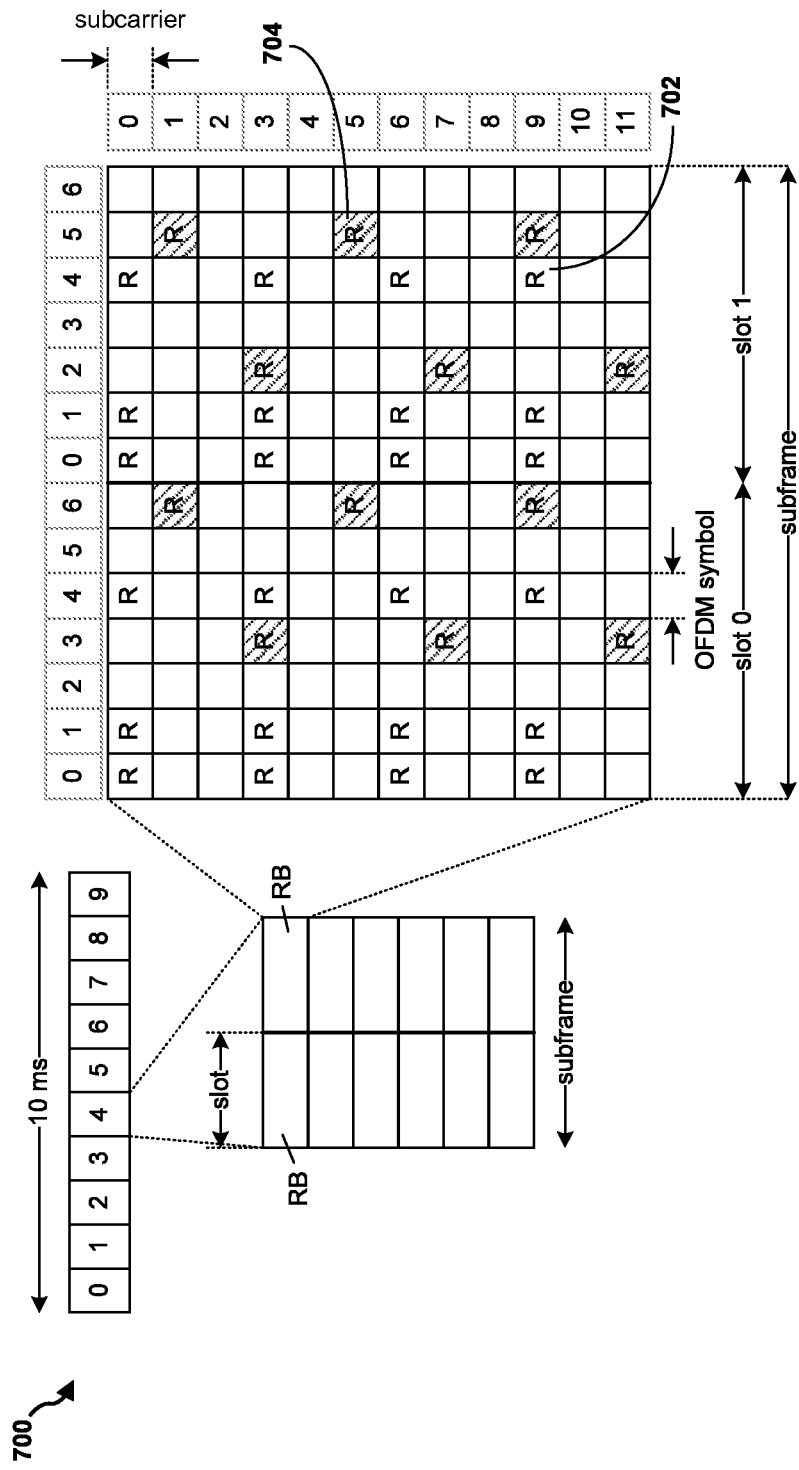
FIG. 7 is a diagram illustrating an example of a DL frame structure in LTE by which offload services via an NHN may be provided.

FIG. 7 is a diagram 700 illustrating an example of a DL frame structure in LTE by which discoverable offload services via an NHN may be provided. In a non-limiting example, a notification, a system information block (SIB), a PLMN identification, and/or a Non-Access message (NAS) from NHN 306 (FIG. 3A) to UE 324 (FIG. 3A) may be transmitted in accordance with the DL frame structure illustrated here. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 702, 704, include DL reference signals (DL-RS). The DL-RS include Cell-specific RS (CRS) (also sometimes called common RS) 702 and UE-specific RS (UE-RS) 704. Each UE-RS 704 is transmitted only on the resource block upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 8:
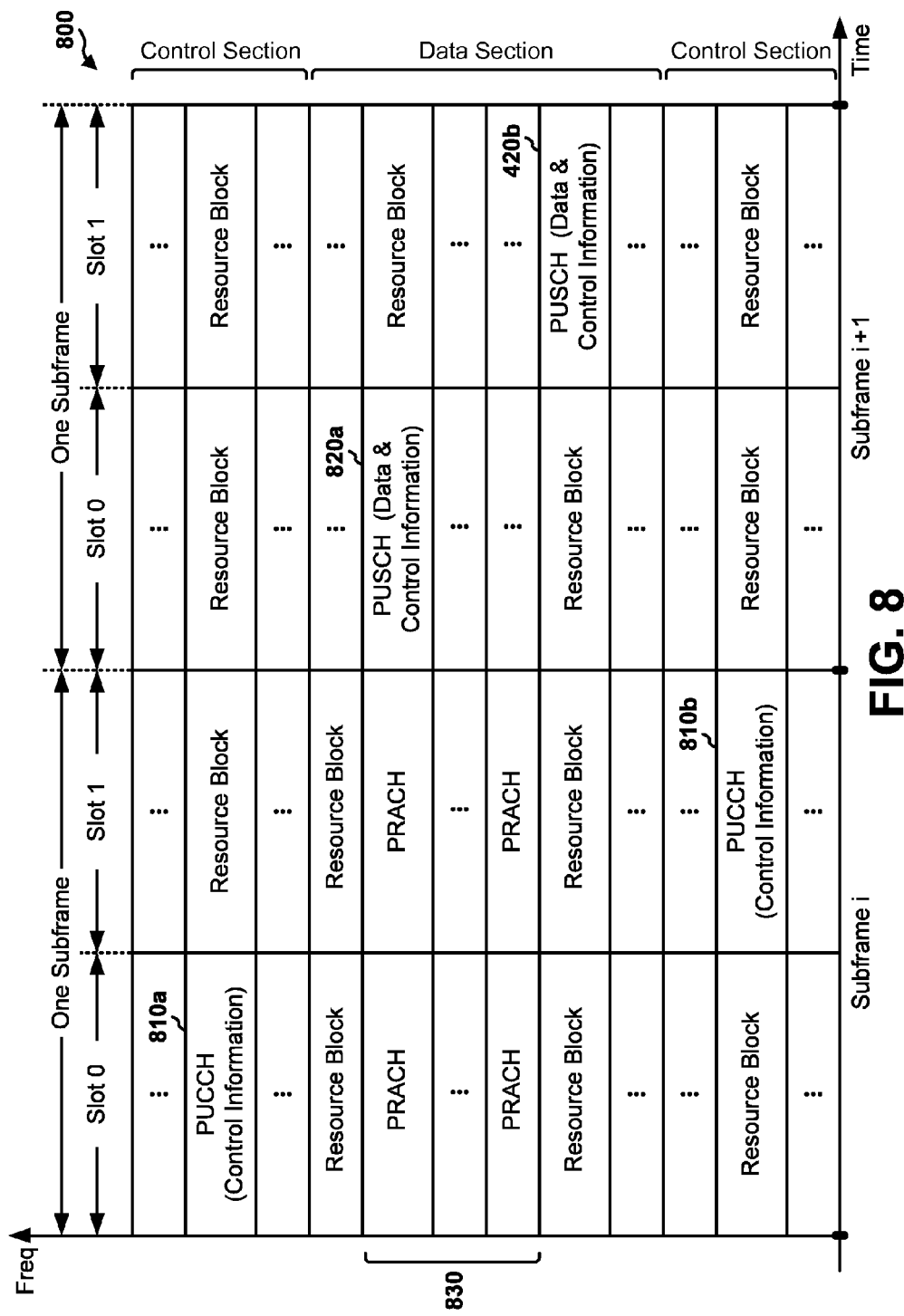
FIG. 8 is a diagram illustrating an example of an UL frame structure in LTE by which offload services via an NHN may be provided.

FIG. 8 is a diagram 800 illustrating an example of an UL frame structure in LTE by which discoverable offload services via an NHN may be provided. In a non-limiting example, a request from UE 324 (FIG. 3A) to access the internet may be transmitted in accordance with the UL frame structure illustrated here. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 810*a*, 810*b* in the control section to transmit control information to an eNB. The UE may also be assigned resource blocks 820*a*, 820*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 830. The PRACH 830 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 9:
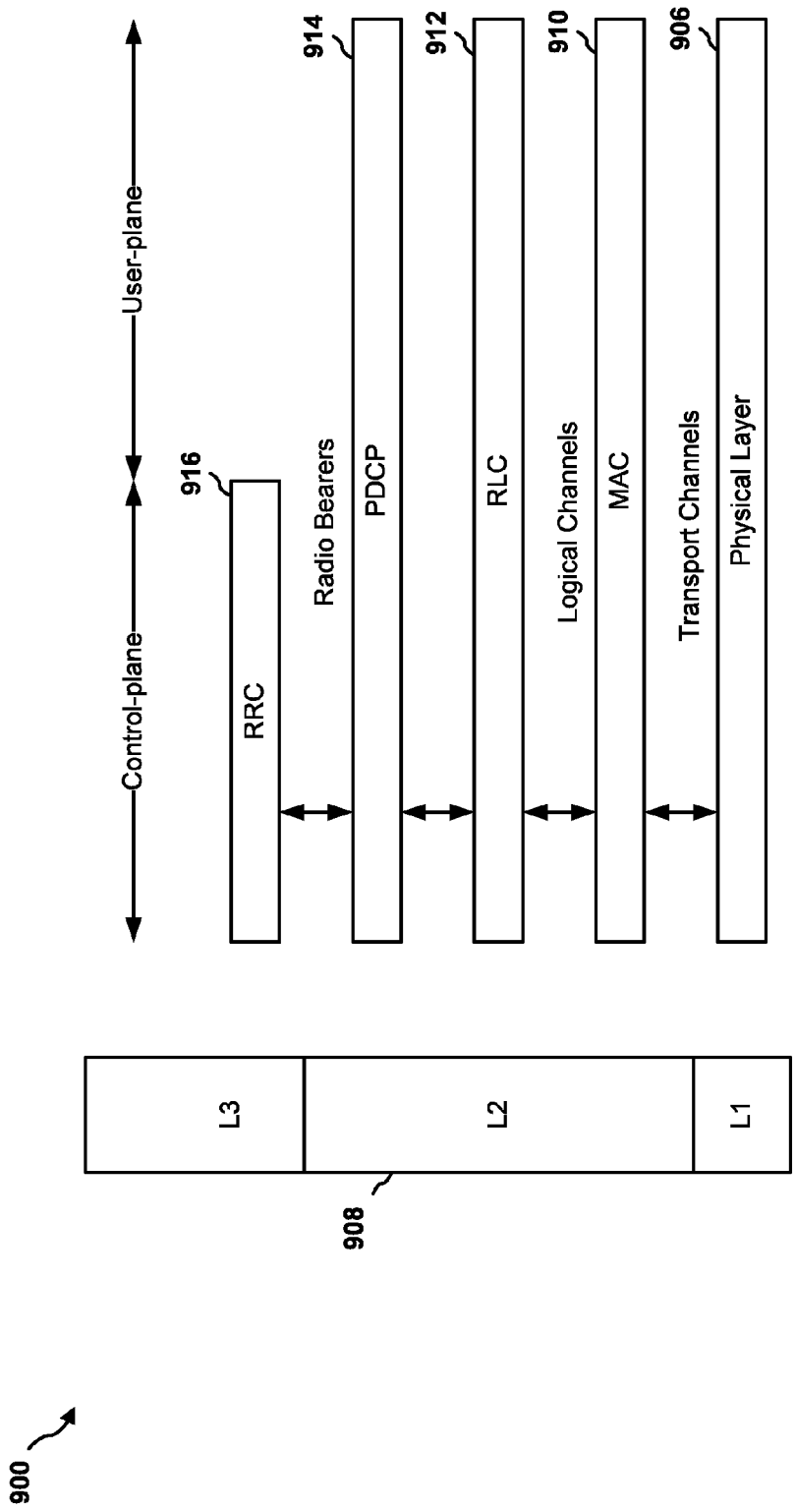
FIG. 9 is a diagram illustrating an example of a radio protocol architecture for the user and control plane by which offload services via an NHN may be provided.

FIG. 9 is a diagram 900 illustrating an example of a radio protocol architecture for the user and control planes in LTE by which discoverable offload services via an NHN may be provided. In a non-limiting example, the notification, the system information block, the PLMN identification, the NAS message from NHN 306 (FIG. 3A) to UE 324 (FIG. 3A) and/or the request from UE 324 (FIG. 3A) to NHN 306 (FIG. 3A) may be transmitted in accordance with radio protocol architecture 900. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 906. Layer 2 (L2 layer) 908 is above the physical layer 906 and is responsible for the link between the UE and eNB over the physical layer 906.

In the user plane, the L2 layer 908 includes a media access control (MAC) sublayer 910, a radio link control (RLC) sublayer 912, and a packet data convergence protocol (PDCP) 914 sublayer, which are terminated at the eNB on the network side. Although not shown, the UE may have several upper layers above the L2 layer 908 including a network layer (e.g., IP layer) that is terminated at the PDN gateway 118 on the network side, and an application layer that is terminated at the other end of the connection (e.g., far end UE, server, etc.).

The PDCP sublayer 914 provides multiplexing between different radio bearers and logical channels. The PDCP sublayer 914 also provides header compression for upper layer data packets to reduce radio transmission overhead, security by ciphering the data packets, and handover support for UEs between eNBs. The RLC sublayer 912 provides segmentation and reassembly of upper layer data packets, retransmission of lost data packets, and reordering of data packets to compensate for out-of-order reception due to hybrid automatic repeat request (HARQ). The MAC sublayer 910 provides multiplexing between logical and transport channels. The MAC sublayer 910 is also responsible for allocating the various radio resources (e.g., resource blocks) in one cell among the UEs. The MAC sublayer 910 is also responsible for HARQ operations.

In the control plane, the radio protocol architecture for the UE and eNB is substantially the same for the physical layer 906 and the L2 layer 908 with the exception that there is no header compression function for the control plane. The control plane also includes a radio resource control (RRC) sublayer 916 in Layer 3 (L3 layer). The RRC sublayer 916 is responsible for obtaining radio resources (e.g., radio bearers) and for configuring the lower layers using RRC signaling between the eNB and the UE.

Figure 10:
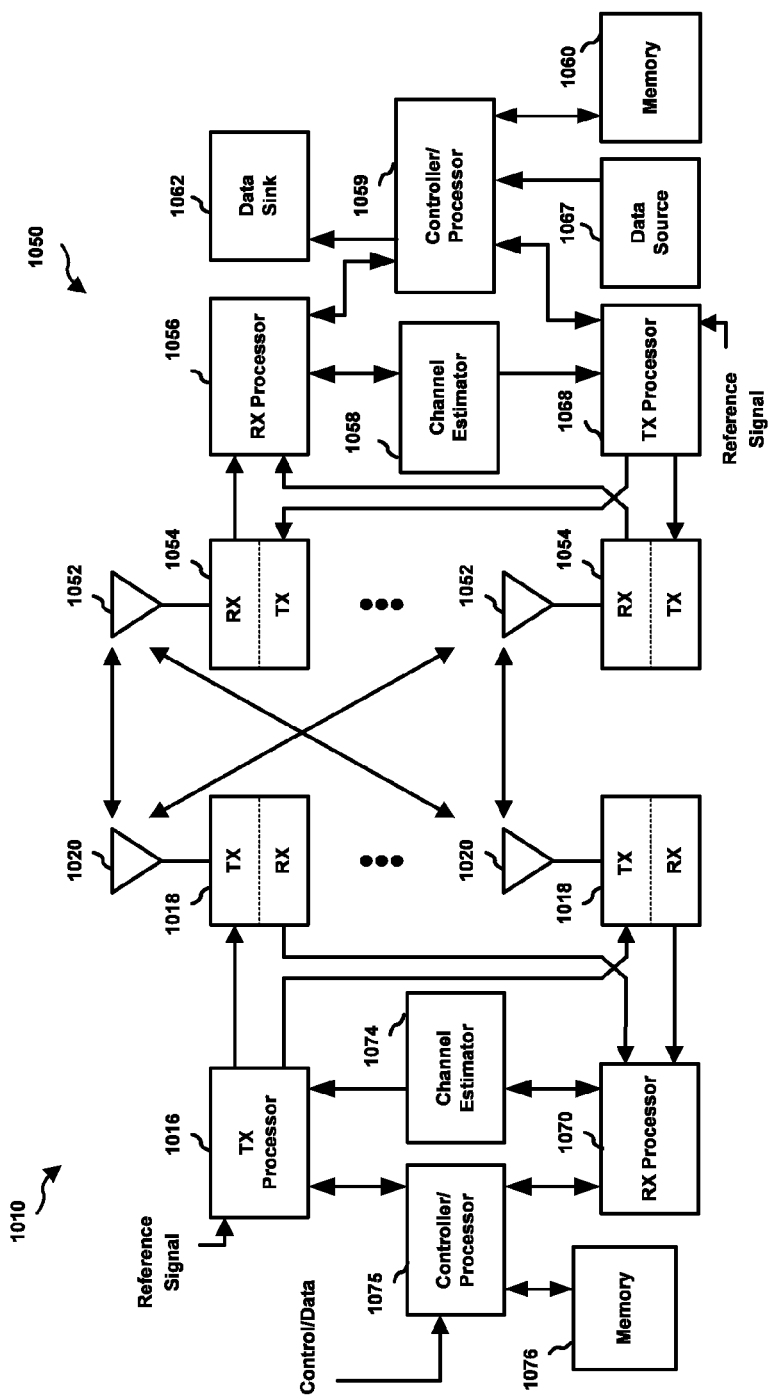
FIG. 10 is a diagram illustrating an example of an evolved Node B and user equipment in an access network by which offload services via an NHN may be provided.

FIG. 10 is a block diagram of an eNB 1010 in communication with a UE 1050 in an access network by which discoverable offload services via an NHN may be provided. In a non-limiting example, eNB 1010 may refer to an eNB of NHN 306 (FIG. 3A) or one of NH eNB1 378, NH eNB2 376, or NH eNB3 374 (FIG. 3B). In the DL, upper layer packets from the core network are provided to a controller/processor 1075. The controller/processor 1075 implements the functionality of the L2 layer. In the DL, the controller/processor 1075 provides header compression, ciphering, packet segmentation and reordering, multiplexing between logical and transport channels, and radio resource allocations to the UE 1050 based on various priority metrics. The controller/processor 1075 is also responsible for HARQ operations, retransmission of lost packets, and signaling to the UE 1050.

The transmit (TX) processor 1016 implements various signal processing functions for the L1 layer (i.e., physical layer). The signal processing functions include coding and interleaving to facilitate forward error correction (FEC) at the UE 1050 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1074 may be used to determine the coding and modulation scheme, as well as for spatial processing. The channel estimate may be derived from a reference signal and/or channel condition feedback transmitted by the UE 1050. Each spatial stream may then be provided to a different antenna 1020 via a separate transmitter 1018TX. Each transmitter 1018TX may modulate an RF carrier with a respective spatial stream for transmission.

At the UE 1050, each receiver 1054RX receives a signal through its respective antenna 1052. Each receiver 1054RX recovers information modulated onto an RF carrier and provides the information to the receive (RX) processor 1056. The RX processor 1056 implements various signal processing functions of the L1 layer. The RX processor 1056 may perform spatial processing on the information to recover any spatial streams destined for the UE 1050. If multiple spatial streams are destined for the UE 1050, they may be combined by the RX processor 1056 into a single OFDM symbol stream. The RX processor 1056 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 1010. These soft decisions may be based on channel estimates computed by the channel estimator 1058. The soft decisions are then decoded and deinterleaved to recover the data and control signals that were originally transmitted by the eNB 1010 on the physical channel. The data and control signals are then provided to the controller/processor 1059.

The controller/processor 1059 implements the L2 layer. The controller/processor can be associated with a memory 1060 that stores program codes and data. The memory 1060 may be referred to as a computer-readable medium. In the UL, the controller/processor 1059 provides demultiplexing between transport and logical channels, packet reassembly, deciphering, header decompression, control signal processing to recover upper layer packets from the core network. The upper layer packets are then provided to a data sink 1062, which represents all the protocol layers above the L2 layer. Various control signals may also be provided to the data sink 1062 for L3 processing. The controller/processor 1059 is also responsible for error detection using an acknowledgement (ACK) and/or negative acknowledgement (NACK) protocol to support HARQ operations.

In the UL, a data source 1067 is used to provide upper layer packets to the controller/processor 1059. The data source 1067 represents all protocol layers above the L2 layer. Similar to the functionality described in connection with the DL transmission by the eNB 1010, the controller/processor 1059 implements the L2 layer for the user plane and the control plane by providing header compression, ciphering, packet segmentation and reordering, and multiplexing between logical and transport channels based on radio resource allocations by the eNB 1010. The controller/processor 1059 is also responsible for HARQ operations, retransmission of lost packets, and signaling to the eNB 1010.

Channel estimates derived by a channel estimator 1058 from a reference signal or feedback transmitted by the eNB 1010 may be used by the TX processor 1068 to select the appropriate coding and modulation schemes, and to facilitate spatial processing. The spatial streams generated by the TX processor 1068 may be provided to different antenna 1052 via separate transmitters 1054TX. Each transmitter 1054TX may modulate an RF carrier with a respective spatial stream for transmission.

The UL transmission is processed at the eNB 1010 in a manner similar to that described in connection with the receiver function at the UE 1050. Each receiver 1018RX receives a signal through its respective antenna 1020. Each receiver 1018RX recovers information modulated onto an RF carrier and provides the information to a RX processor 1070. The RX processor 1070 may implement the L1 layer.

The controller/processor 1075 implements the L2 layer. The controller/processor 1075 can be associated with a memory 1076 that stores program codes and data. The memory 1076 may be referred to as a computer-readable medium. In the UL, the control/processor 1075 provides demultiplexing between transport and logical channels, packet reassembly, deciphering, header decompression, control signal processing to recover upper layer packets from the UE 1050. Upper layer packets from the controller/processor 1075 may be provided to the core network. The controller/processor 1075 is also responsible for error detection using an ACK and/or NACK protocol to support HARQ operations.

In some aspects, eNB 1010 may refer to a network entity that may be a part of a network, such as an NHN, which enables data communication between UE 1050 and a mobile network that is connected to the NHN having eNB 1010.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary non-transitory storage medium is coupled to the processor such that the processor can read information from, and write information to, the storage medium. In the alternative, the storage medium may be integral to the processor (e.g., cache memory).

Accordingly, it will also be appreciated, that certain aspects of the disclosure can include a non-transitory computer-readable medium embodying a method for providing offload services via a neutral host network, such as described above with reference to processes 400, 500, and 600.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method for providing offload services via a neutral host network (NHN), comprising:
    establishing an authorization relationship, at the NHN, with a mobile network; and
    sending, by the NHN, a notification indicating the authorization relationship of the NHN with the mobile network to one or more user equipments (UEs) within radio coverage of the NHN,
    wherein the authorization relationship specifies that the NHN is authorized by the mobile network to provide offload services for at least one UE of the one or more UEs that is associated with the mobile network, and
    wherein the sending of the notification comprises broadcasting a public land mobile network (PLMN) identification of the mobile network to the one or more UEs.

2. The method of claim 1, wherein the broadcasting comprises transmitting the PLMN identification in a system information block (SIB).

3. The method of claim 1, wherein the sending of the notification comprises:
    establishing a wireless connection with the at least one UE of the one or more UEs; and
    transmitting the PLMN identification of the mobile network to the at least one UE of the one or more UEs during or subsequent to the establishing of the wireless connection.

4. The method of claim 3, wherein the transmitting comprises transmitting the PLMN identification in a Non-Access Stratum (NAS) message.

5. The method of claim 1, wherein the NHN is operated independently from the mobile network and from other NHNs.

6. The method of claim 1, wherein the offload services provide internet connectivity that is independent from operations provided by the mobile network to UEs associated with the mobile network.

7. The method of claim 1, wherein the offload services allow the at least one UE of the one or more UEs to transmit and receive data as an alternative to transmitting and receiving data via a primary access service provided by the mobile network.

8. The method of claim 7, wherein the data includes data traffic associated with an access point name (APN), data traffic associated with an application, or data traffic exchanged with an endpoint.

9. The method of claim 7, wherein the offload services allow the at least one UE of the one or more UEs to use the primary access service and the offload services concurrently or sequentially.

10. The method of claim 1, further comprising authenticating, via a local or remote server, that the at least one UE associated with the mobile network have subscribed to the offload services.

11. The method of claim 1, further comprising establishing an additional authorization relationship, at the NHN, with an additional mobile network, wherein the notification further indicates the additional authorization relationship with the additional mobile network.

12. A method for receiving offload services via a neutral host network (NHN), comprising:
    receiving a notification from the NHN that indicates an authorization relationship of the NHN with a mobile network, wherein the authorization relationship specifies that the NHN is authorized to provide offload services associated with the mobile network, and wherein the notification from the NHN comprises a public land mobile network (PLMN) identification of the mobile network;
    submitting credentials associated with the mobile network to the NHN to establish a connection with the NHN; and
    accessing one or more data services through the connection via the offload services provided by the NHN.

13. The method of claim 12, further comprising switching data traffic to the connection via the offload services provided by the NHN from the mobile network.

14. The method of claim 12, further comprising searching for the NHN to find an alternative internet connectivity prior to receiving the notification from the NHN.

15. The method of claim 12, wherein the PLMN identification is included in a system information block (SIB).

16. The method of claim 12, wherein the PLMN identification is transmitted in a Non-Access Stratum (NAS) message.

17. The method of claim 12, wherein the accessing one or more data services through the connection via the offload services provided by the NHN comprises transmitting and receiving data as an alternative to transmitting and receiving data via a primary access service provided by the mobile network.

18. The method of claim 17, wherein the data includes data traffic associated with an access point name (APN), data traffic associated with an application, or data traffic exchanged with an endpoint.

19. The method of claim 17, further comprising accessing the one or more data services via the offload services and the primary access service concurrently or sequentially.

20. An apparatus for providing offload services via a neutral host network (NHN), comprising:
    means for establishing an authorization relationship, at the NHN, with a mobile network; and
    means for sending, by the NHN, a notification indicating the authorization relationship of the NHN with the mobile network to one or more user equipments (UEs) within radio coverage of the NHN,
    wherein the authorization relationship specifies that the NHN is authorized by the mobile network to provide offload services for at least one UE from the one or more UEs that is associated with the mobile network, and
    wherein the means for sending the notification comprises means for broadcasting a public land mobile network (PLMN) identification of the mobile network to the one or more UEs.

21. The apparatus of claim 20, wherein the means for broadcasting comprises means for transmitting the PLMN identification in a system infounation block (SIB).

22. The apparatus of claim 20, wherein the means for sending the notification comprises:
    means for establishing a wireless connection with the at least one UE of the one or more UEs; and
    means for transmitting the PLMN identification of the mobile network to the at least one UE of the one or more UEs during or subsequent to the establishing of the wireless connection.

23. The apparatus of claim 22, wherein the means for transmitting comprises means for transmitting the PLMN identification in a Non-Access Stratum (NAS) message.

24. The apparatus of claim 20, wherein the NHN is operated independently from the mobile network and from other NHNs.

25. The apparatus of claim 20, wherein the offload services provide internet connectivity that is independent from operations provided by the mobile network to the UEs associated with the mobile network.

26. The apparatus of claim 20, further comprising means for authenticating, via a local or remote server, that the UEs associated with the mobile network have subscribed to the offload services.

27. The apparatus of claim 20, wherein the at least one UE of the one or more UEs is configured to transmit and receive data as an alternative to transmitting and receiving data via a primary access service provided by the mobile network.

28. The apparatus of claim 27, wherein the at least one UE of the one or more UEs is further configured select the data to offload based on applications associated with the data, access point name (APN) associated with the data, endpoints that exchange the data with the at least one UE of the one or more UEs, or types of the data.

29. The apparatus of claim 27, wherein the at least one UE of the one or more UEs is further configured to use the primary access service and the offload services concurrently or sequentially.

30. An apparatus for providing offload services via a neutral host network (NHN), comprising:
a memory storing executable instructions;
a processor in communication with the memory, wherein the processor is configured to execute the instructions to:
establish an authorization relationship, at the NHN, with a mobile network; and
a transmitter configured to
send, by the NHN, a notification indicating the authorization relationship of the NHN with the mobile network to one or more user equipments (UEs) within radio coverage of the NHN, wherein the authorization relationship specifies that the NHN is authorized by the mobile network to provide offload services for at least one UE of the one or more UEs that is associated with the mobile network; and
broadcast a public land mobile network (PLMN) identification of the mobile network to the one or more UEs.

31. The apparatus of claim 30, wherein the transmitter is further configured to transmit the PLMN identification in a system information block (SIB).

32. The apparatus of claim 30, further comprising a receiver,
wherein the transmitter and the receiver are configured to establish a wireless connection with the at least one UE of the one or more UEs, and
wherein the transmitter is further configured to transmit the PLMN identification of the mobile network to the at least one UE of the one or more UEs during or subsequent to the establishing of the wireless connection.

33. The apparatus of claim 32, wherein the transmitter is further configured to transmit the PLMN identification in a Non-Access Stratum (NAS) message.

34. The apparatus of claim 30, wherein the NHN is operated independently from the mobile network and from other NHNs.

35. The apparatus of claim 30, wherein the offload services provide Internet connectivity that is independent from operations provided by the mobile network to the UEs associated with the mobile network.

36. The apparatus of claim 30, further comprising an authentication, authorization, and accounting (AAA)/Mobility Management Entity (MME) server configured to authenticate that the UEs associated with the mobile network have subscribed to the offload services.

37. The apparatus of claim 30, wherein the at least one UE of the one or more UEs is configured to transmit and receive data as an alternative to transmitting and receiving data via a primary access service provided by the mobile network.

38. The apparatus of claim 37, wherein the at least one UE of the one or more UEs is further configured to select the data to offload based on applications associated with the data, access point name (APN) associated with the data, endpoints that exchange the data with the at least one UE of the one or more UEs, or types of the data.

39. The apparatus of claim 37, wherein the at least one UE of the one or more UEs is further configured to use the primary access service and the offload services concurrently or sequentially.

40. A non-transitory computer-readable medium storing computer executable code for providing offload services via a neutral host network (NHN), comprising:
code for establishing an authorization relationship, at the NHN, with a mobile network; and
code for sending, by the NHN, a notification indicating the authorization relationship of the NHN with the mobile network to one or more user equipments (UEs) within radio coverage of the NHN,
wherein the authorization relationship specifies that the NHN is authorized by the mobile network to provide offload services for at least one UE of the one or more UEs that is associated with the mobile network, and
wherein the code for sending the notification comprises code for broadcasting a public land mobile network (PLMN) identification of the mobile network to the one or more UEs.

41. The non-transitory computer-readable medium of claim 40, wherein the code for broadcasting comprises code for transmitting the PLMN identification in a system information block (SIB).

42. The non-transitory computer-readable medium of claim 40, wherein the code for sending the notification comprises:
code for establishing a wireless connection with the at least one UE of the one or more UEs; and
code for transmitting the PLMN identification of the mobile network to the at least one UE of the one or more UEs during or subsequent to the establishing of the wireless connection.

43. The non-transitory computer-readable medium of claim 40, wherein the at least one UE of the one or more UEs is configured to transmit and receive data as an alternative to transmitting and receiving data via a primary access service provided by the mobile network.

44. The non-transitory computer-readable medium of claim 43, wherein the at least one UE of the one or more UEs is further configured to select the data to offload based on applications associated with the data, access point name (APN) associated with the data, endpoints that exchange the data with the at least one UE of the one or more UEs, or types of the data.

45. The non-transitory computer-readable medium of claim 43, wherein the at least one UE of the one or more UEs is further configured to use the primary access service and the offload services concurrently or sequentially.

* * * * *